United States Patent [19]

Shields et al.

[11] 4,382,658

[45] May 10, 1983

[54] USE OF POLYSILICON FOR SMOOTHING OF LIQUID CRYSTAL MOS DISPLAYS

[75] Inventors: Steven E. Shields, San Diego; Bruce G. Fletcher, Vista, both of Calif.

[73] Assignee: Hughes Aircraft Company, Culver City, Calif.

[21] Appl. No.: 209,455

[22] Filed: Nov. 24, 1980

[51] Int. Cl.³ .............................................. G02F 1/135
[52] U.S. Cl. .................................................. 350/334
[58] Field of Search ............... 350/331 R, 332, 339 R, 350/336, 334

[56] References Cited

U.S. PATENT DOCUMENTS 3,862,360 1/1975 Dill et al. ............................ 350/332
4,191,454 3/1980 Braatz et al. ........................ 350/332
4,239,346 12/1980 Lloyd .................................. 350/334

*Primary Examiner*—John K. Corbin
*Assistant Examiner*—P. M. Dzierzynski
*Attorney, Agent, or Firm*—Robert M. Wallace; William J. Bethurum; Anthony W. Karambelas

[57] ABSTRACT

In a liquid crystal imaging display comprising a liquid crystal layer formed over the top surface of a MOS integrated circuit, the reflectivity of the pixel control electrodes is enhanced by means of a polycrystalline silicon layer formed over the MOS integrated circuit and polished to have an optically smooth surface over which the pixel control electrodes and the liquid crystal may be placed. Contrast ratios on the order of 100 to 1 are achieved.

10 Claims, 11 Drawing Figures

USE OF POLYSILICON FOR SMOOTHING OF LIQUID CRYSTAL MOS DISPLAYS

TECHNICAL FIELD

This invention is related to liquid crystal displays which are controlled by an underlying metal oxide semiconductor (MOS) circuit formed monolithically with the liquid crystal and in particular relates to means for increasing the optical quality of the image reflected by the liquid crystal.

BACKGROUND OF THE INVENTION

Liquid crystal displays are formed by a liquid crystal layer overlying a plurality of conductive electrodes, each defining a pixel of the image displayed by the overlying liquid crystal layer. A particular pixel or a portion of the liquid crystal layer may be rendered nonreflective by supplying an electric current to the corresponding underlying electrode. The individual electrode defining each pixel may be addressed by row and column by means of an underlying metal oxide semiconductor (MOS) integrated circuit formed monolithically with the metal electrodes and the liquid crystal layer.

A fundamental problem in this type of device is that the MOS integrated circuit has a very rough top surface over which the metal electrodes are formed by reason of the planar non-uniformity between various ones of the thin film layers forming the MOS integrated circuit, as is well known in the art. The resulting rough surface of the metal electrode deposited over the MOS integrated circuit reduces the amount of the incident light reflected through the liquid crystal. This in turn reduces the contrast between non-reflecting pixels (in which the corresponding electrode supplies an electric current) and reflecting pixels in a liquid crystal layer. Typically, a 20 to 1 contrast ratio is achieved in such devices, the contrast ratio being limited by the rough contour of the top metal surface over which the liquid crystal layer is formed. Thus, it has seemed that the necessity for controlling a liquid crystal display using an underlying MOS integrated circuit unavoidably limits the contrast ratio which may be achieved with liquid crystal displays using MOS integrated circuits.

SUMMARY OF THE INVENTION

Contrast ratios in excess of 100 to 1 may be achieved in liquid crystal displays of the present invention by the use of a polycrystalline silicon layer formed between the pixel control electrode underlying the liquid crystal layer and the MOS integrated circuit. After the MOS integrated circuit has been formed, a polycrystalline silicon layer is placed thereover and its top surface is then smoothed or polished. Thereafter, the pixel control electrodes are formed over the polycrystalline silicon layer and the liquid crystal layer placed thereover. Because the pixel control electrodes are formed over a smooth surface, the light incident upon the liquid crystal layer is reflected by the metal electrodes much more readily than the metal electrodes of the prior art which had a much rougher surface. Accordingly, the contrast ratio of the liquid crystal display of this invention is significantly enhanced, providing a contrast ratio of about 100 to 1, in comparison with the contrast ratio of 20 to 1 of the prior art.

DESCRIPTION OF THE DRAWINGS

The invention is best understood by reference to the accompanying drawings of which.

DETAILED DESCRIPTION

Figure 1:
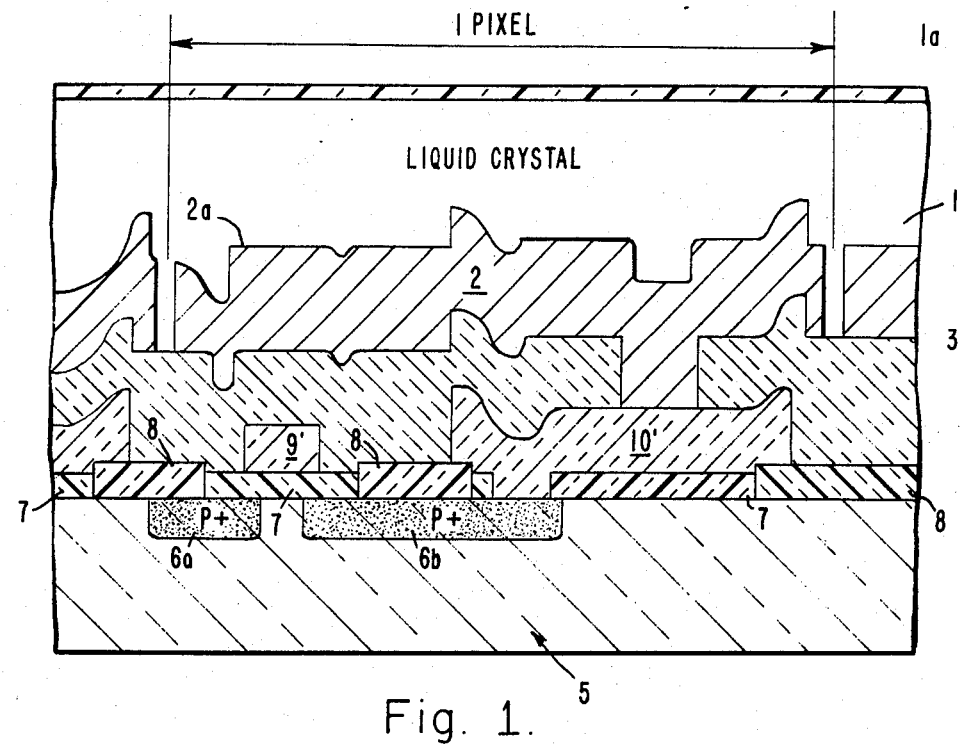
FIG. 1 is a simplified cross-sectional view of a liquid crystal display device of the prior art.

FIG. 1 is a simplified cross-sectional view of a liquid crystal display device of the prior art which includes a liquid crystal layer 1 divided into a plurality of pixels as indicated in dashed-line, each pixel controlled by a pixel control electrode 2 comprising an aluminum layer, an underlying silicon dioxide insulating layer 3 separating the pixel control electrodes 2 from a supporting metal oxide semiconductor (MOS) integrated circuit formed on a silicon substrate 4. The MOS integrated circuit comprises a plurality of cells 5 which are periodically repeated throughout the integrated circuit, each cell 5 controlling a particular one of the pixel control electrodes 2 and comprising source and drain diffusions 6a, 6b in the surface of the silicon substrate 4, a thin oxide layer 7, a field oxide layer 8, a polycrystalline silicon gate electrode 9, and a polycrystalline silicon capacitor electrode 10 connected to the diffusion 6b.

If the pixel illustrated in FIG. 1 is to have a dark hue in contrast to the remainder of the liquid crystal layer, then electric current is supplied from the polycrystalline silicon capacitor electrode 10 and through the liquid crystal layer 1 to a transparent return electrode 11. For this purpose, the source and drain diffusions 6a, 6b are biased by suitable source and drain voltages $V_{dd}$, $V_{ss}$ while the polycrystalline silicon gate electrode 9 is held at a voltage at least slightly exceeding the gate threshold voltage $V_t$. As a result, electric current flows through the channel between the source and drain diffusions 6a, 6b and charges the capacitor electrode 10. The capacitor electrode 10 then discharges through the metal pixel control electrode 2 across the liquid crystal layer 1 during a single video frame in which the pixel of FIG. 1 scatters light incident upon the top surface 1a of the liquid crystal 1. In the remaining portions of the liquid crystal layer 1 wherein no electric current is applied, light incident upon the liquid crystal surface 1a passes through the liquid crystal layer 1 and is reflected directly by the underlying metal layer 2 and thus presents a bright hue which contrasts with the dark hue of other pixels which are turned "on" to scatter light. The contrast ratio is necessarily limited by the roughness of the metal surface 2a caused by the planar nonuniformity between various thin film layers 7, 8, 9, 10 of the MOS integrated circuit cell 5, as illustrated in FIG. 1. Typically, devices such as that illustrated in FIG. 1 achieve a contrast ratio between darkened and undarkened pixels on the order of 20 to 1.

In the liquid crystal display device of the present invention, contrast ratios of about 100 to 1 are achieved by imposing a layer of polycrystalline silicon between the metal pixel control electrode layer 2 and the underlying MOS integrated circuit 3, 4, 5. The polycrystalline silicon layer is smoothed or polished before the deposition of the metal pixel control electrodes 2 in order to increase the reflectivity of metal electrodes 2.

The process for making the invention is illustrated sequentially in FIG. 2. FIG. 2a illustrates the underlying MOS integrated circuit 5 corresponding to that of FIG. 1. In the first step of the process of this invention, the MOS integrated circuit is covered with a layer 20 of undoped silicon dioxide on the order of 4,000 Å thick. The next step is illustrated in FIG. 2b in which a polycrystalline silicon layer 22 is deposited over the insulating layer 20. It should be noted that the underlying polycrystalline silicon electrodes 9, 10 of the MOS integrated circuit are preferably doped in order to render the polycrystalline material in these electrodes conductive. Accordingly, the insulating silicon dioxide layer 20 prevents any of the dopant impurities in the underlying polycrystalline layers 9, 10 from diffusing into the overlying polycrystalline layer 22. Subsequently, the top surface of the polycrystalline layer 22 is polished to remove the rough contours illustrated in solid-line until the polished top surface corresponds to the horizontal smooth dashed-line of FIG. 2b. Preferably, the display is first intimately mounted onto an optical flat, using wax. The polycrystalline silicon layer 22 is then polished using a TIZOX 1300 slurry diluted 10 to 1 with water in a SUBA IV pad. TIZOX is a registered trademark of Transelco, a division of Farrell Corporation, Penn Yan, N.Y., and SUBA IV is a trademark of Rodel Incorporated, Diamond State Industrial Park, Newark, Del.

Figure 2A:
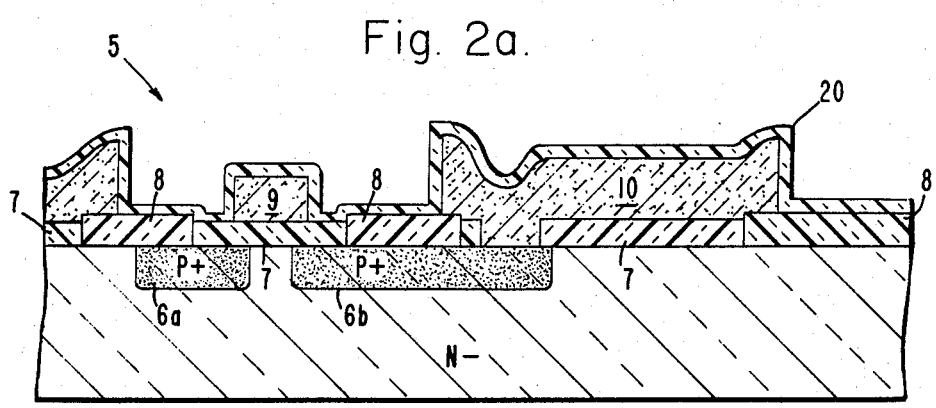
FIGS. 2a, b, c, d, e and f illustrate the process for making the liquid crystal display device of the present invention.
Figure 2B:
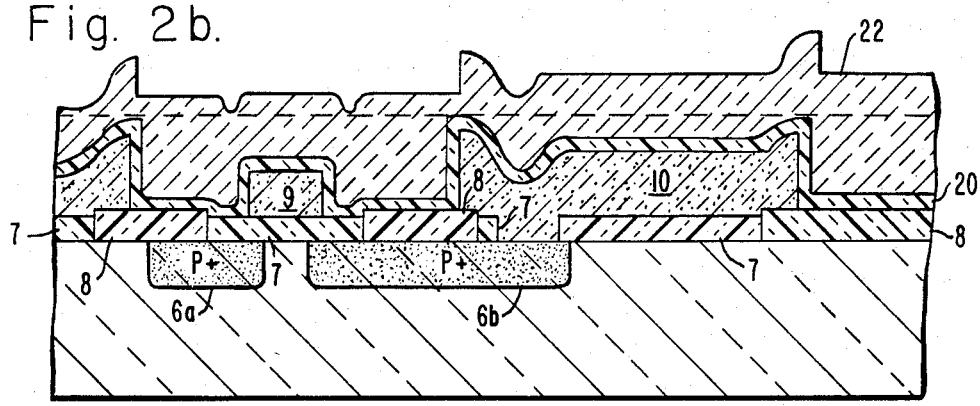
Figure 2C:
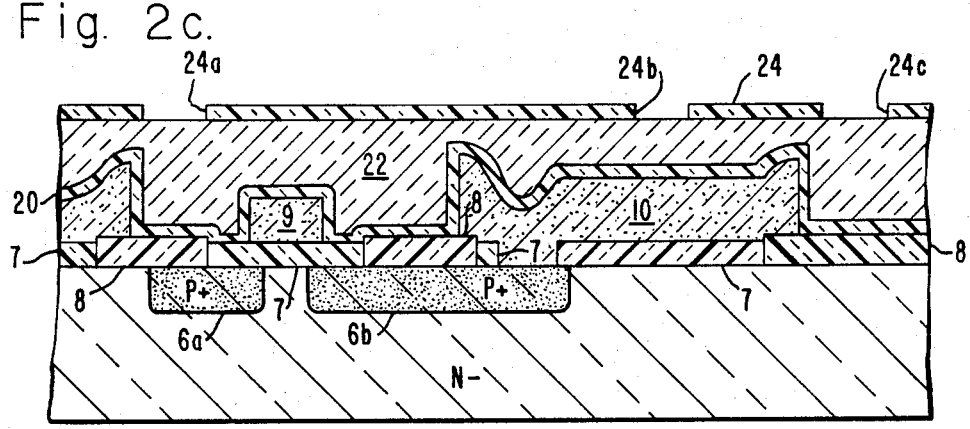

Next, as illustrated in FIG. 2c, another layer of silicon dioxide 24 is grown over the polycrystalline silicon layer 22 and is etched to form openings 24a, b, c therein using standard photolithographic techniques. The oxide layer 24 is of approximately 2,500 Å thickness and acts as a mask in the subsequent etchings step of the polycrystalline silicon layer 22.

Figure 2D:
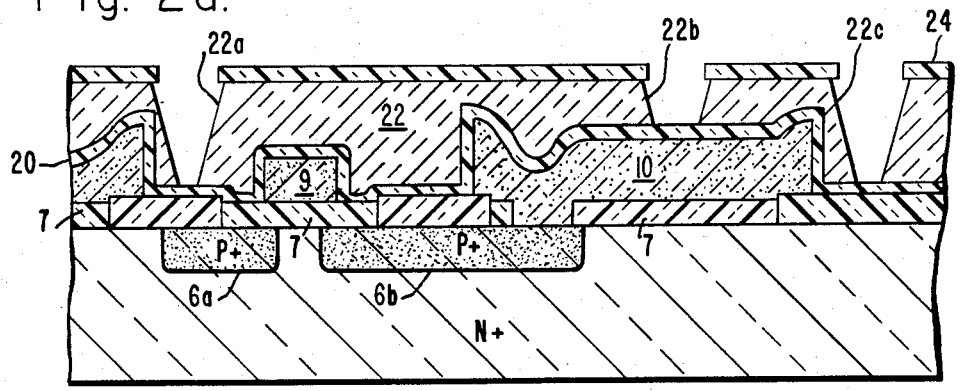
Figure 2E:
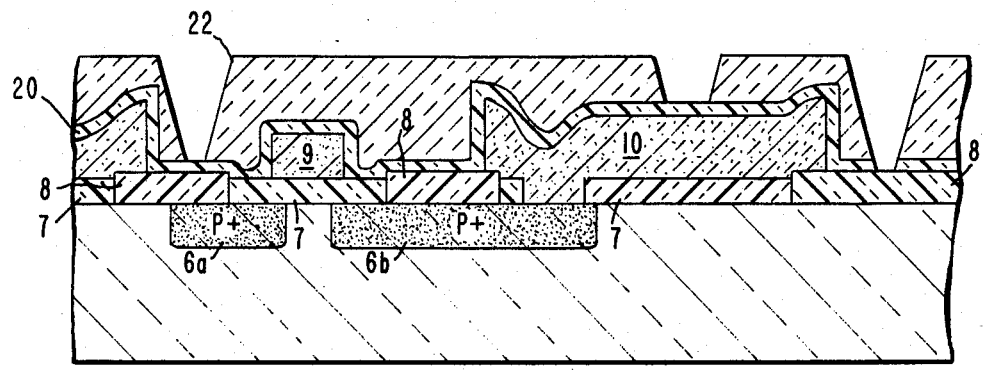
Figure 2F:
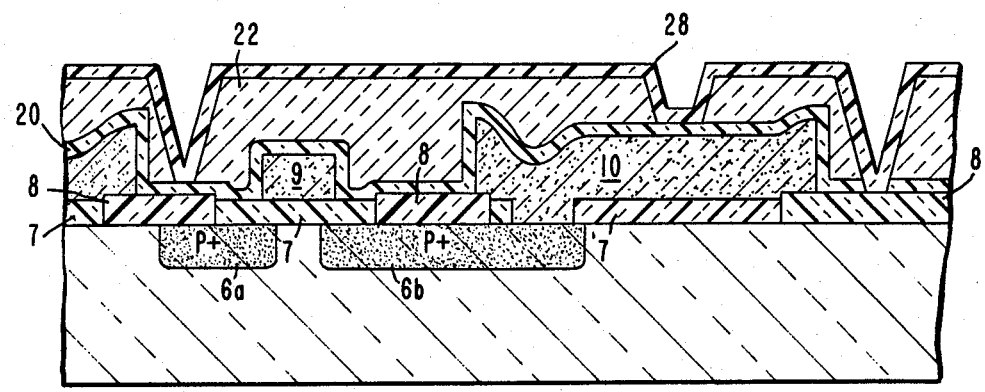

The polycrystalline silicon layer 22 is then etched using the overlying oxide layer 24 as a mask to form grooves 22a, 22c and opening 22b in the polycrystalline silicon layer 22 as shown in FIG. 2d. A secondary function of the underlying oxide layer 20 is to stop the etching of the opening 22b before the underlying polycrystalline silicon electrode 10 is damaged during the etching step of FIG. 2d. The grooves 22a, 22c provide isolation of the polycrystalline silicon layer 22 between adjacent image pixels while the hole 22b acts as a contact opening through the polycrystalline silicon layer 22. The overlying oxide mask 24 is subsequently removed as illustrated in FIG. 2e during an etching step in which portions of the underlying oxide layer 20 exposed by the holes 22a, b, c are also etched to a reduced thickness. Subsequently, as shown in FIG. 2f, a silicon dioxide layer 28 of approximately 2,500 Å thickness is grown over the polycrystalline silicon layer 22 so as to cover all exposed edges of the polycrystalline silicon layer 22, including the surfaces exposed during formation of the grooves 22a, c. The polycrystalline silicon layer 22 is thus divided into islands, one island for each pixel, each island of polycrystalline silicon being completely surrounded by insulating oxide 20, 28. Separation of the polycrystalline silicon layer 22 into individual islands and insulation of each island is necessary to prevent leakage of charge between pixels. A further advantage of the oxide layers 20, 28 is that minority carriers generated in each polycrystalline silicon island 22 by incident photons are confined to within the polycrystalline silicon island 22 and therefore cannot reach the metal electrode 30. Furthermore, such light generated carriers are prevented from charging or discharging the polycrystalline silicon capacitor plate 10 because the distance between the optically exposed portion of the silicon layer 22 (namely at the groove 28) and the contact opening 22b is preferably greater than the photo carrier mean free path length. The remaining portions of the silicon layer 22 are shielded from the incident photons by the metal electrode 30.

Figure 2G:
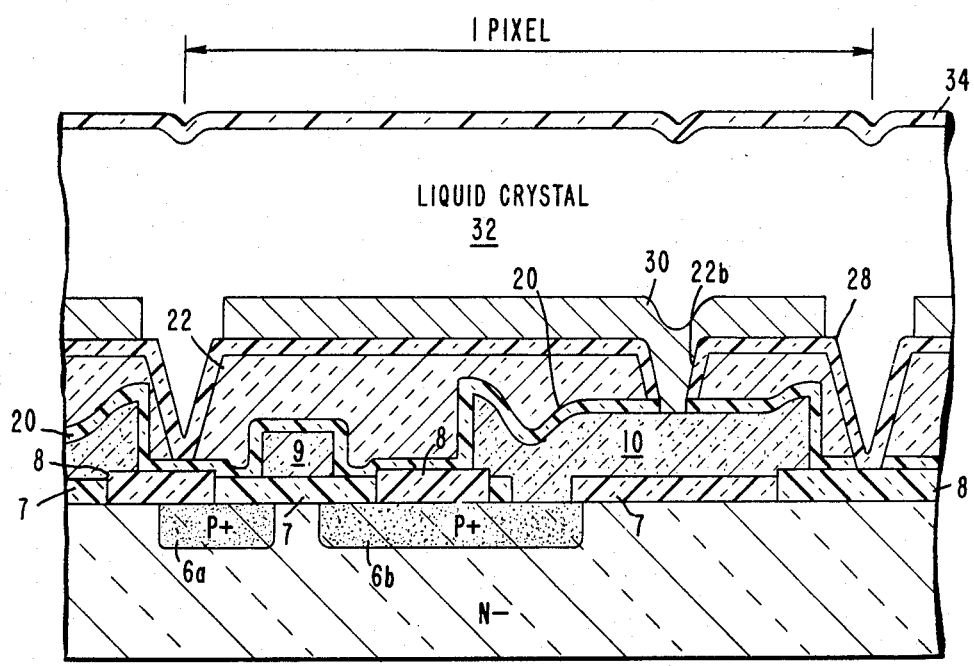

Subsequently, a contact opening in formed in registration with the opening 22b through the oxide layers 28, 20. Thereafter, as illustrated in FIG. 2g, a metal layer 30 is deposited over the oxide layer 28, the metal layer 30 filling the contact opening 22b and making contact with the capacitor electrode 10. The metal layer 30 is then photolithographically separated into separate islands overlying each island of polycrystalline silicon 22 to define the individual image pixels of the display. Thereafter, a liquid crystal layer 32 is deposited over the metal layer 30 and a transparent electrode 34 is deposited over the liquid crystal layer 32. Preferably, the polycrystalline silicon layer 22 remains undoped.

It has been found that the fabrication of the liquid crystal display of this invention in accordance with the foregoing process yields an image display device having a contrast ratio on the order of 100 to 1, which is an improvement of a factor of 5 over the prior art. Polycrystalline silicon is the preferred material for the layer 22 although other materials may be practical in this application. However, a substitution of polymide film for the polycrystalline silicon layer 22 resulted in a "crinkling" or "crazing" of the polyimide film upon evaporation of the metal layer 30 thereover, which significantly degraded contrast. Also, in attempts to substitute doped silicon dioxide in place of the polycrystalline silicon layer 22, uniform etching of the plurality of openings 22b forming contact to the capacitor electrode 10 was found impractical.

It is possible to completely eliminate the necessity for the opening 22b in the polycrystalline silicon layer 22. In particular, in a first alternative embodiment of the invention illustrated in the simplified cross-sectional view of FIG. 3, a contact opening 20b in the underlying oxide layer 20 permits contact between the capacitor electrode 10 and the overlying polycrystalline silicon layer 22 while a contact opening 28b in the overlying oxide layer 28 permits contact between the polycrystalline silicon layer 22 and the overlying metal electrode 30. Accordingly, a conductor between the contact openings 28b and 20b may be provided by ion implanting the polycrystalline silicon layer 22 in a region 22d which is in vertical registration with the openings 20b and 28b. This ion implantation may be performed after formation of the opening 28b in the overlying silicon dioxide layer 28 but before deposition of the metal layer 20 so that the oxide layer 28 acts as a mask for the ion implantation of the polycrystalline silicon layer 22.

Figure 3:
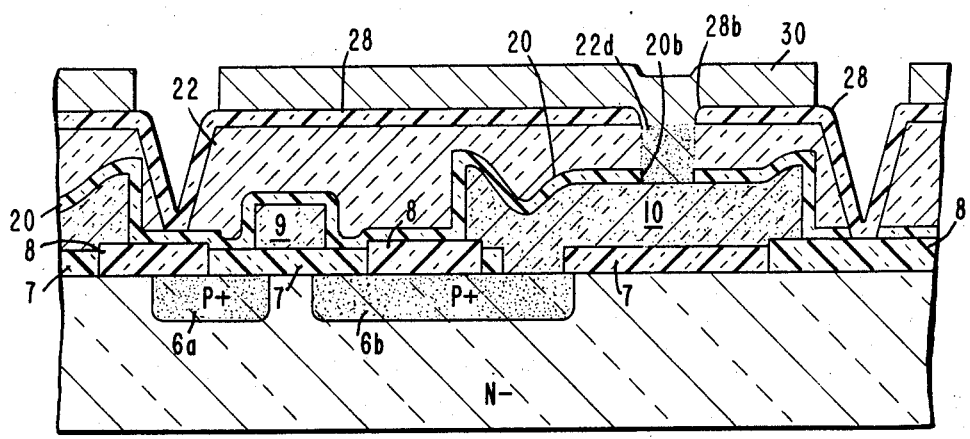
FIG. 3 is a simplified cross-sectional view of an alternative embodiment of the invention.
Figure 4:
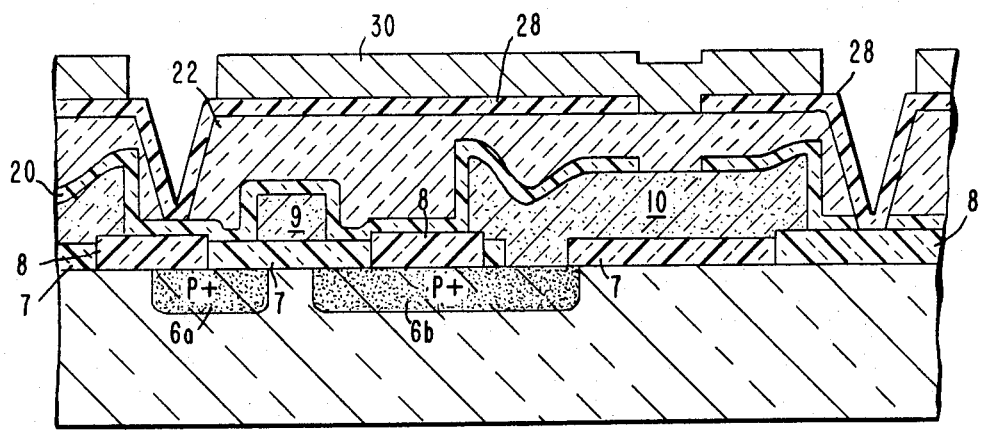
FIG. 4 is a simplified cross-sectional view of another alternative embodiment of the invention.

In a second alternative embodiment of the invention illustrated in FIG. 4, a structure similar to that of FIG. 3 is fabricated with the exception that the entire polycrystalline silicon layer 22 is diffused or implanted with dopant impurities prior to the formation of the oxide layer 28 so that electrical conduction between the capacitor electrode 10 and the pixel control electrode 30 is made through the same path as in FIG. 3. Another possibility is that the conductive region 22b of the device of FIG. 3 may be formed by diffusion of dopant impurities instead of ion implantation, again using the oxide layer 28 as a mask.

It should be noted that the use of doped polycrystalline silicon, while permitting elimination of the contact hole 22b, makes the etching of the polycrystalline silicon layer 22 into islands even more difficult and therefore is not preferred. Another alternative is anodization of the polycrystalline silicon layer 22 as an alternative to etching.

Figure 5:
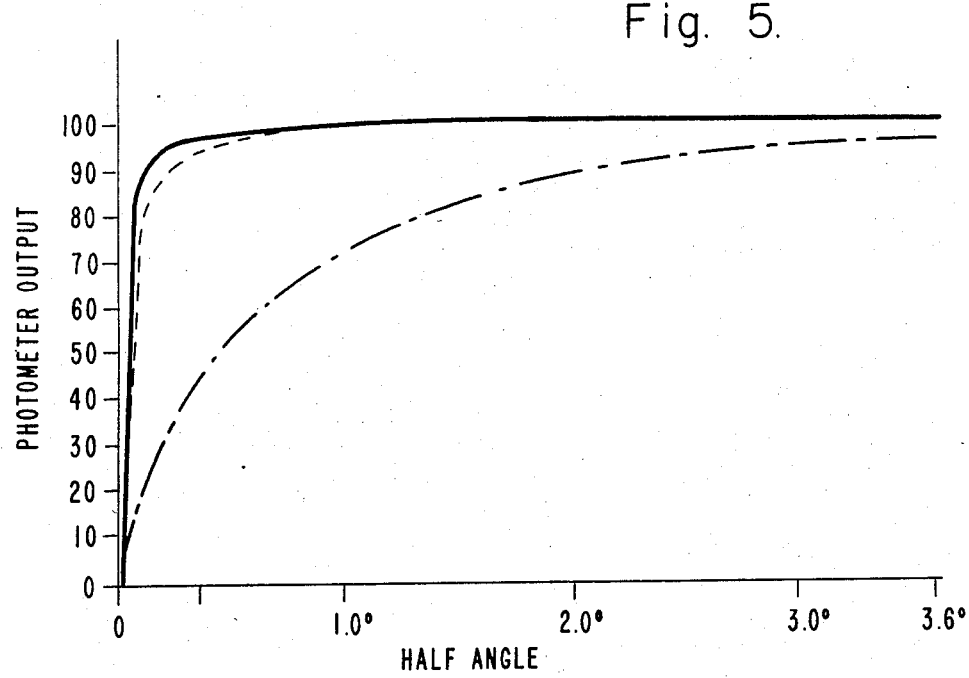
FIG. 5 is a graph illustrating the comparative performance of the invention.

Tests of device reflectivity made after wafer processing, but before mounting of the wafer to its substrate, show that the smoothed display of the invention illustrated in FIG. 2 compares very well with an ideal display which consists of the metal reflective electrode pattern on a base oxided silicon wafer. FIG. 5 is a graph illustrating the intensity of reflected light as a function of incident angle. The solid-line illustrates the ideal display performance (wherein reflectivity is almost independent of the incident angle), the dashed-line illustrates the performance of the liquid crystal display of the present invention while the alternately dashed line illustrates the performance of a liquid crystal display corresponding to the prior art device illustrated in FIG. 1. FIG. 5 shows that the performance of the display of the present invention provides a significant improvement over the prior art and approaches the ideal performance.

What is claimed is:

1. A liquid crystal display comprising:
   a semiconductor integrated circuit formed on a semiconductor substrate and having a top surface;
   a polycrystalline silicon layer formed over the top surface of said integrated circuit and divided into islands, said polycrystalline silicon layer having a top surface which is flatter than the top surface of said integrated circuit;
   a plurality of reflective pixel control electrodes each formed over the top surface of an individual one of said polycrystalline silicon islands; and
   a liquid crystal layer formed over said pixel control electrodes.

2. The display of claim 1 wherein said plurality of pixel control electrodes are individually connected to elements of said integrated circuit.

3. The display of claim 1 further comprising insulating material surrounding each of said polycrystalline silicon islands, including contact hole means providing connection between said pixel control electrodes and elements of said integrated circuits.

4. The display of claim 1 wherein an element of said integrated circuit comprises a source, a drain and a channel in said substrate, an overlying gate electrode and a capacitor electrode connected to one of said source and drain, said capacitor electrode connected to one of said pixel control electrodes.

5. The display of claims 2, 3 or 4 wherein connection to each of said pixel control electrodes is made through contact openings in said polycrystalline silicon layer.

6. The display of claims 2, 3 or 4 wherein connection to each of said pixel control electrodes is made through said polycrystalline silicon layer by dopant impurities in said polycrystalline silicon layer.

7. The display of claim 4 wherein connection between said capacitor electrode and said one pixel control electrode is made by dopant impurities located at least in a region in said polycrystalline silicon layer which directly contacts said capacitor electrode.

8. The display of claim 7 wherein said dopant impurities are ion implanted.

9. The device of claim 3 wherein said insulating material has a sufficient thickness to substantially prevent light generated carriers in each of said silicon islands leaving said silicon islands.

10. The display of claim 1 wherein said polycrystalline silicon layer is undoped.

* * * * *